United States Patent
Yamaguchi et al.

(10) Patent No.: US 9,548,975 B2
(45) Date of Patent: Jan. 17, 2017

(54) AUTHENTICATION METHOD, AUTHENTICATION SYSTEM, AND SERVICE DELIVERY SERVER

(71) Applicant: DeNA Co., Ltd., Tokyo (JP)

(72) Inventors: Toru Yamaguchi, Tokyo (JP); Kotaro Ito, Tokyo (JP); Sota Mizushima, Tokyo (JP)

(73) Assignee: DeNA Co., Ltd., Tokyo (JP)

(*) Notice: Subject to any disclaimer, the term of this patent is extended or adjusted under 35 U.S.C. 154(b) by 463 days.

(21) Appl. No.: 14/031,707

(22) Filed: Sep. 19, 2013

(65) Prior Publication Data
US 2014/0298441 A1 Oct. 2, 2014

(30) Foreign Application Priority Data

Mar. 28, 2013 (JP) ................................. 2013-070301

(51) Int. Cl.
*H04L 29/00* (2006.01)
*H04L 29/06* (2006.01)

(52) U.S. Cl.
CPC ....... *H04L 63/0815* (2013.01); *H04L 63/0807* (2013.01)

(58) Field of Classification Search
CPC ..................... H04L 63/0815; H04L 63/0807
See application file for complete search history.

(56) References Cited

U.S. PATENT DOCUMENTS

| 6,023,698 A * | 2/2000 | Lavey, Jr. ........... H04L 12/2856 |
| 6,092,196 A * | 7/2000 | Reiche ................... G06F 21/41 705/52 |
| 2004/0088260 A1 * | 5/2004 | Foster .................... H04L 63/08 705/64 |
| 2007/0044146 A1 * | 2/2007 | Murase .................. G06F 21/33 726/10 |
| 2009/0199276 A1 * | 8/2009 | Schneider ........... H04L 63/0815 726/5 |
| 2010/0050243 A1 * | 2/2010 | Hardt .................. H04L 63/0823 726/6 |
| 2010/0138899 A1 * | 6/2010 | Yamamoto .............. G06F 21/31 726/3 |

(Continued)

FOREIGN PATENT DOCUMENTS

| JP | 2009-080726 A | 4/2009 |
| JP | 2012-510655 A | 5/2012 |
| WO | 2010-060704 A2 | 6/2010 |

OTHER PUBLICATIONS

Japanese Patent Application No. 2013-070301; Office Action mailed on Sep. 2, 2014.

*Primary Examiner* — Michael Pyzocha
(74) *Attorney, Agent, or Firm* — Procopio, Cory, Hargreaves & Savitch LLP (57) ABSTRACT

A client terminal transmits a signal related to an authentication request to a service delivery server through a browser every time an application is started by an instruction from a user. Upon receiving the authentication request from the client terminal, an authentication server executes authentication processing in cooperation with the service delivery server based on authentication information of an application of the client terminal, a session of which has been established, and stored in the service delivery server, and user information related to the user stored in the authentication server.

15 Claims, 7 Drawing Sheets

(56) References Cited

U.S. PATENT DOCUMENTS

| | | | | |
|---|---|---|---|---|
| 2011/0184791 A1* | 7/2011 | Wang | G06Q 30/02 | 705/14.7 |
| 2011/0208799 A1* | 8/2011 | Labrogere | G06F 17/30887 | 709/203 |
| 2011/0219427 A1* | 9/2011 | Hito | G06F 21/00 | 726/3 |
| 2012/0179828 A1* | 7/2012 | Kobayashi | G06F 21/44 | 709/227 |
| 2012/0227087 A1* | 9/2012 | Brown | G06Q 50/01 | 726/3 |
| 2012/0324556 A1* | 12/2012 | Yefimov | H04W 12/06 | 726/7 |
| 2013/0007867 A1* | 1/2013 | Sowatskey | H04L 63/0815 | 726/8 |
| 2013/0086639 A1* | 4/2013 | Sondhi | H04L 63/0815 | 726/4 |
| 2013/0086669 A1* | 4/2013 | Sondhi | H04L 63/0815 | 726/8 |
| 2013/0125226 A1* | 5/2013 | Shah | H04L 63/0815 | 726/7 |
| 2013/0254858 A1* | 9/2013 | Giardina | G06F 21/42 | 726/7 |
| 2014/0082715 A1* | 3/2014 | Grajek | G06F 17/30876 | 726/8 |
| 2014/0359741 A1* | 12/2014 | Kistner | H04L 63/0823 | 726/7 |

\* cited by examiner

AUTHENTICATION METHOD, AUTHENTICATION SYSTEM, AND SERVICE DELIVERY SERVER

CROSS-REFERENCE TO RELATED APPLICATION(S)

This application claims the benefit of Japanese Patent Application No. 2013-070301, filed Mar. 28, 2013, the disclosure of which is hereby incorporated by reference in its entirety.

BACKGROUND OF THE INVENTION

Field of the Invention

The present invention relates to a technology of performing transmission/reception of messages using an information processing terminal.

Description of Related Art

In recent years, with the development of an internet technology, a method of downloading an application such as a game program to a client terminal and processing the application in the client terminal has been spread. For example, it is possible to download a game from a server and to play the game in a smart phone terminal. Usually, the user enrolls as a member and obtains an ID and a password from a service operator that provides a game through a terminal. After that, when the user inputs the ID and the password in the terminal, an authentication server performs predetermined authentication processing, so that log-in becomes available and the user can enjoy the game.

Such log-in processing is performed every time a different application system is used. Therefore, the user is prompted to input personal information such as an ID and a password, and it is troublesome for the user. Therefore, a technology of "single sign on (SSO)" that realizes an access to a plurality of systems with one-time log-in processing has been developed. In SSO, an authentication server issues an authentication ticket that guarantees authentication has been completed. When a browser of the client terminal conducts data communication with an application server, the browser of the client terminal transmits the authentication ticket to the application server. The application server refers to the authentication ticket and confirms the client terminal has been already logged in (for example, see JP 2006-236281 A and JP 2008-059038 A).

SUMMARY OF THE INVENTION

In the previous authentication, a sequence for the SSO processing is configured on the assumption that the authentication server and the application server (hereinafter, also referred to as service delivery server) are operated by separate operators. Here, in a case where the authentication server and the service delivery server are operated by the same operator, the previous SSO processing is not necessarily efficient and secure.

The present invention has been made in view of the problems, and an objective is to provide a server device, a method, and a system capable of efficiently executing secure SSO processing by causing an authentication server and a service delivery server to cooperate with each other.

An aspect of the present invention relates to an authentication method.

The authentication method is a method in a system including a client terminal that stores one or more applications, a service delivery server connected with the client terminal through a network and configured to provide the client terminal with a service, and an authentication server connected with the client terminal and the service delivery server and configured to execute authentication processing.

In this method, the client terminal transmits a signal related to an authentication request to the service delivery server through a browser every time an application is started by an instruction from a user; the service delivery server issues session information related to the client terminal when receiving the authentication request from the client terminal, attaches the session information to the authentication request, and returns the authentication request to the client terminal; and the client terminal transmits the authentication request to which the session information is attached to the authentication server.

Upon receiving the authentication request from the client terminal, the authentication server executes the authentication processing in cooperation with the service delivery server based on authentication information of the application of the client terminal, a session of which has been established, and stored in the service delivery server, and user information related to the user stored in the authentication server.

According to such an aspect, the service delivery server that has received the authentication request from the client terminal and the authentication server execute the authentication processing in cooperation with each other based on the information related to the client terminal and the application stored in the servers in advance, whereby secure SSO processing can be more efficiently realized.

Further, in the authentication method, when a session has been established between the authentication server and at least one application in the client terminal regarding the authentication request, the authentication server may issue an ID token of the client terminal.

The service delivery server may establish a session between the service delivery sever and an application newly started by the client terminal regarding the ID token after determining the client terminal has been authenticated by the authentication server by verifying the ID token issued by the authentication server.

According to such an aspect, the session is established between the client terminal and an application newly started by the client terminal regarding the ID token after it is determined that the client terminal has been already authenticated by the authentication server, whereby authentication in one server easily enables authentication processing in another server, and therefore, secure authentication processing can be efficiently conducted.

Further, in the authentication method, when a session has been established between the service delivery server and at least one application in the client terminal regarding the authentication request, the service delivery server may issue an ID token of the client terminal.

The authentication server may establish a session between the authentication server and an application newly started by the client terminal regarding the ID token after determining the client terminal has been authenticated by the service delivery server by verifying the ID token issued by the service delivery server.

According to such an aspect, the session is established between the client terminal and an application newly started by the client terminal regarding the ID token after it is determined that the client terminal has been already authenticated by the authentication server, whereby authentication in one server easily enables authentication processing in another server, and therefore, secure authentication processing can be efficiently conducted.

Further, in the authentication method, the client terminal may control a first browser configured to operate in a background and a second browser capable of receiving an input of the user information from the user. The first browser and the second browser may be operable while sharing the session information each other as a function of the application.

The client terminal may cause the first browser to execute the authentication processing between the first browser and the service delivery server, and when a session has not been established between the application started in the client terminal that is an authentication requestor and the service delivery server, and the user is prompted to input the user information, the client terminal may start the second browser in order to receive the user information, and switching the authentication processing to between the second browser and the service delivery server.

According to such an aspect, the first browser executes the authentication processing between the first browser and the service delivery server, and when a session has not been established between the application started in the client terminal that is an authentication requestor and the service delivery server, and the user is prompted to input the user information, the second browser is started in order to receive the user information, and the authentication processing is switched to between the second browser and the service delivery server, whereby secure SSO processing can be more smoothly executed without making the user aware of an operation.

Further, in the authentication method, the client terminal may include an authentication assist application that operates as an external function of the application, and does not share the session information with the first browser and the second browser.

Even if a session has not been established between the started application and the authentication server, but a session has been established between the authentication assist application and the authentication server, the authentication assist application may be started in place of the second browser, and the authentication processing may be switched to between the authentication assist application and the service delivery server.

According to such an aspect, when a session has not been established between the application started in the client terminal that is an authentication requestor and the authentication server, but a session has been established between the authentication assist application and the authentication server, the authentication assist application may be started in place of the second browser, and the authentication processing may be switched to between the authentication assist application and the service delivery server, whereby more secure SSO processing can be efficiently executed.

Another aspect of the present invention relates to an authentication system. The authentication system includes a client terminal storing one or more applications; a service delivery server connected with the client terminal through a network, and configured to provide the client terminal with a service; and an authentication server connected with the client terminal and the service delivery server, and configured to execute authentication processing.

The client terminal transmits a signal related to an authentication request to the service delivery server through a browser every time an application is started by an instruction from a user. The service delivery server issues session information related to the client terminal when receiving the authentication request from the client terminal, attaches the session information to the authentication request, and returns the authentication request to the client terminal. The client terminal transmits the authentication request to which the session information is attached to the authentication server. Upon receiving the authentication request from the client terminal, the authentication server executes the authentication processing in cooperation with the service delivery server based on authentication information of the application of the client terminal, a session of which has been established, and stored in the service delivery server, and user information related to the user stored in the authentication.

Still another aspect of the present invention relates to a service delivery server.

The service delivery server is a server delivery server in a system including a client terminal that stores one or more applications, a service delivery server connected with the client terminal through a network and configured to provide the client terminal with a service, and an authentication server connected with the client terminal and the service delivery server and configured to execute authentication processing.

The service delivery server includes: a server communication unit configured to issue session information related to the client terminal when receiving an authentication request from the client terminal, to attach the session information to the authentication request and to return the authentication request, and to causes the client terminal to transit the authentication request to which the session information is attached to the authentication server; and an authentication control unit configured, upon receiving the authentication request from the client terminal, to execute the authentication processing in cooperation with the authentication server based on authentication information of the application of the client terminal, a session of which has been established, and stored in the service delivery server, and user information related to the user stored in the authentication server.

Still another aspect of the present invention relates to an authentication method.

The authentication method is a method in a service delivery server in a system including a client terminal that stores one or more applications, a service delivery server connected with the client terminal through a network and configured to provide the client terminal with a service, and an authentication server connected with the client terminal and the service delivery server and configured to execute authentication processing.

This method includes the steps of: receiving an authentication request from the client terminal; issuing session information related to the client terminal; attaching the session information to the authentication request and returning the authentication request, and causing the client terminal to transmit the authentication request to which the session information is attached to the authentication server; and upon receiving the authentication request from the client terminal, executing the authentication processing in cooperation with the authentication server based on authentication information of the application of the client terminal, a session of which has been established, and stored in the service delivery server, and user information related to the user stored in the authentication server.

Note that any combination of the above-described configuration elements and conversion of the expression of the present invention among a method, a device, a system, and a computer program are also efficient as other aspects of the present invention.

According to the present invention, more secure authentication processing can be realized by implementation of the authentication processing by a service delivery server and an authentication server in cooperation with each other.

DETAILED DESCRIPTION OF THE INVENTION

Before starting description of embodiments of the present invention, an outline of the present invention will be described. The present invention is an authentication technology for installation-type applications, which enhances security in authentication processing by including a configuration in which not only an authentication server but also a service delivery server assist the authentication processing of a client terminal.

In the present invention, the authentication processing is executed based on authentication information of an application of the client terminal, a session of which has been established and stored in the service delivery server, and user information related to the user stored in the authentication server. Therefore, authentication in one server can guarantee authentication in another server, and efficient and secure authentication processing can be performed. Hereinafter, description will be given using an example. Hereinafter, the service delivery server may be a platform that provides a service, and the authentication server may be a server that provides an application. Further, these servers may be physically integrated.

Embodiment 1

Figure 1:
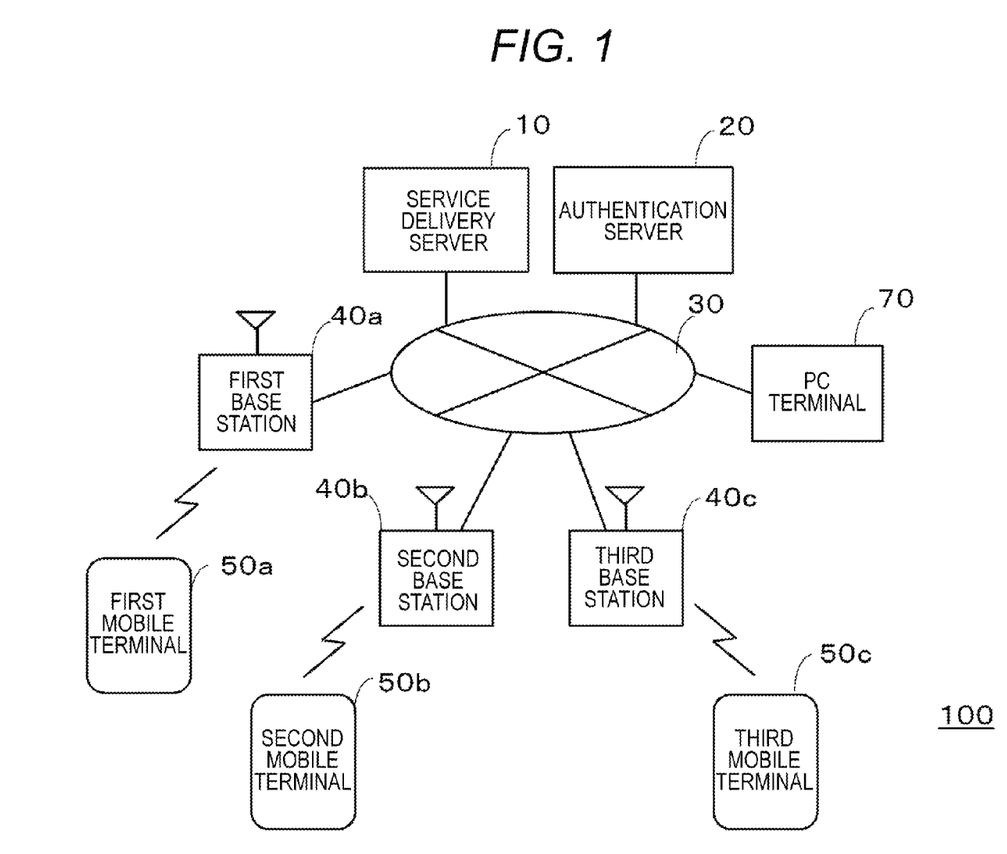
FIG. 1 is a diagram illustrating a configuration example of an authentication system according to Embodiment 1.

First, Embodiment 1 will be described. FIG. 1 is a diagram illustrating an authentication system 100 according to Embodiment 1 of the present invention. The authentication system 100 includes a service delivery server 10, an authentication server 20, a network 30 that connects the service delivery server 10, the authentication server 20 and a base station 40 with a wired line, a first base station 40a to a third base station 40c represented by the base station 40, a first mobile terminal 50a to a third mobile terminal 50c represented by a mobile terminal 50, and a PC terminal 70.

Note that only three base stations 40 and three mobile terminals 50 are illustrated for convenience of the drawing. However, these stations and terminals are not limited to this example, and more base stations 40 and mobile terminals 50 may exist. The same applies to the PC terminal 70. In addition, while the first mobile terminal 50a to the third mobile terminal 50c are drawn to be connected with different base stations 40, respectively, connection of the terminals is not limited to the example. Obviously, the present invention is applicable even if a plurality of mobile terminals 50 is connected with one base station 40.

The service delivery server 10 is a device that provides a net service such as a chart service, and is used to improve efficiency of log-in processing of the client terminal in cooperation with the authentication server 20. The service delivery server 10 executes communication processing for the authentication processing with the authentication server 20, the mobile terminal 50, and the PC terminal 70 through the network 30 and/or the base station 40. Note that, for simple description, description will be hereinafter simply given such that "the communication processing is executed between the service delivery server 10 and the mobile terminal 50 or the PC terminal 70" and the like, and description as to through the network 30 and the base station 40 will be omitted. Further, hereinafter, the mobile terminal 50 and the PC terminal 70 are collectively expressed as a client terminal.

The client terminal transmits a signal related to an authentication request to the service delivery server 10 through a browser every time an application is started by an instruction of the user. When receiving the authentication request from the client terminal, the service delivery server 10 issues session information (Cookie) related to the client terminal, attaches the session information to the authentication request, and returns the authentication request.

The client terminal transmits the authentication request to which the session information is attached to the authentication server 20. Upon receiving the authentication request from the client terminal, the authentication server 20 executes authentication processing in cooperation with the service delivery server 10 based on authentication information of the application of the client terminal, a session of which has been established and stored in the service delivery server, and user information related to the user stored in the authentication server.

Here, the authentication information of an application includes an ID unique to the application and confidential information of the application itself. The authentication information of an application is issued to an application, a session of which has been established, and is managed by the service delivery server 10. As described below, the service delivery server 10 manages the use of the application by the user, authenticates log-in by the user who has valid authorization, and establishes a session of the application if it is valid.

Further, the user information includes a user ID and a password designated by the user. The user information is managed by the authentication server 20. The authentication server 20, as described below, obtains the user information through the user terminal, and compares the obtained user information and the user information stored in advance, thereby to determine and authenticate the validity of the log-in of the user.

As described above, the user may log in the authentication server 10, or may log in the service delivery server 20. In the present invention, when long-in in one server is determined to be valid, the validity is applied to the other server and log-in is accepted. Therefore, authentication results in respective servers are confirmed each other directly between the authentication server 10 and the service delivery server or through a browser of the user terminal.

That is, the authentication server 10 and the service delivery server 20 are operated by the same operator, authentication cooperation like the above becomes possible. Note that even in a case where the authentication server 10 and the service delivery server 20 are operated by different operators, the present invention is obviously applicable as long as the different operators have a reasonable relationship.

Specific description will be given. When the authentication server 20 determines that a session between the authentication server 20 and an application started in the client terminal has been already established with respect to an authentication request from the client terminal, the authentication server 20 issues a one-time ticket associated with the client terminal and transmits the ticket to the client terminal.

"The session has been established" means being in a log-in state. The "being in a log-in state" means that the user input confidential information such as an ID, a password, and the like through a browser of any application or through an authentication assist application (hereinafter, also referred to as specific browser) outside the application, and the confidential information has been confirmed to be proper information based on the authentication information of the application of the client terminal, a session of which has been established and stored in the service delivery server, and the user information related to the user stored in the authentication server, whereby the authentication processing has been completed in the past prior to that point.

The client terminal redirects (transfers) the one-time ticket obtained from the authentication server 20 to the service delivery server 10. In response, the service delivery server 10 transmits the one-time ticket obtained from the client terminal to the authentication server 20, thereby to request issuance of an access token for establishing a session between the service delivery server 10 and the client terminal.

Here, the access token indicates execution authorization of the user with respect to a predetermined application, and by presenting the execution authorization, the user can execute the predetermined application in the client terminal. Further, the one-time ticket includes information indicating which client terminal has requested authentication and which server has authorized and authenticated the client terminal. Further, the access token may be encrypted. In that case, by providing a decryption key to the client terminal in advance prior to the start-up of the browser, more enhanced security can be realized.

After confirming the one-time ticket received from the service delivery server 10 has been issued by the authentication server 20 itself, the authentication server 20 issues an access token related to the one-time ticket and returns the token to the service delivery server 10. The service delivery server 10 transmits the access token received from the authentication server 20 to the client terminal. Accordingly, the client terminal can obtain the access token, and therefore the client terminal can execute the application.

Note that the authentication server 20 may determine a session has been established when the authentication server 20 succeeds in authentication confirmation of an ID token of the client terminal that is an authentication requestor, or when the authentication server 20 confirms the log-in processing from an application started in the client terminal.

Further, when a session has been established between an application started in the client terminal that is an authentication requestor and the service delivery server 10, the service delivery server 10 issues session information including an ID token to the client terminal. The authentication server 20 may verify whether a session has been established by verifying the ID token obtained through the client terminal.

Meanwhile, when a session has not been established between the application started in the client terminal that is an authentication requestor and the authentication server 20, the client terminal transmits the user information to the authentication server 20. Here, the authentication server 20 issues an ID token together with an access token, and transmits them to the service delivery server 10, after the verification of the received user information. The service delivery server 10 may verify the obtained ID token and establish a session, and transmit the access token to the client terminal.

Figure 2:
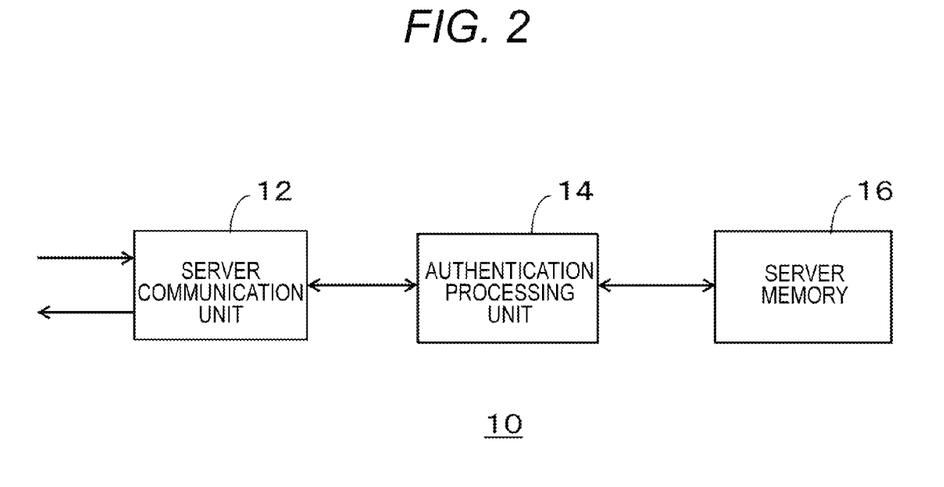
FIG. 2 is a diagram illustrating a configuration example of a service delivery server in the authentication system of FIG. 1.

FIG. 2 is a diagram illustrating a configuration example of the service delivery server 10 in the authentication system 100 of FIG. 1. The service delivery server 10 includes a server communication unit 12, an authentication processing unit 14, and a server memory 16.

The server communication unit 12 receives a signal from the client terminal, the authentication server 20, and the like, executes predetermined demodulation processing, and transmits a demodulated signal to the authentication processing unit 14. Further, the server communication unit 12 applies predetermined modulation processing to the signal transmitted from the authentication processing unit 14, and transmits the modulated signal to the user terminal. Note that a conventional modulation/demodulation technology may be employed as the modulation/demodulation processing in the server communication unit 12. Even in such an aspect, a person skilled in the art would understand the present invention is applicable.

The authentication processing unit 14 receives information related to authentication processing from the client terminal through the server communication unit 12. The authentication processing unit 14 manages the session information and the confidential information such as a user ID and a user password in the server memory 16 for each client terminal. The confidential information may be notified from the client terminal when the client terminal first performs registration processing with the service delivery server 10. Accordingly, when an authentication request is given from the client terminal, a session of which has been established, an ID token is issued without requiring the log-in processing again and smooth SSO processing is executed.

Further, when an authentication request is given from the client terminal, a session of which has not been established, the authentication processing unit 14 confirms whether a session has been already established in the authentication server 20. If the session has been established, the authentication processing unit 14 obtains an ID token from the authentication server 20, thereby to execute smooth SSO processing.

When a session has not been established even in the authentication server 20, the authentication processing unit 14 seeks the confidential information such as a user ID, a password, and the like from the client terminal, performs the log-in processing by comparing the obtained confidential information and the confidential information registered in advance, and establishes a session.

Figure 3:
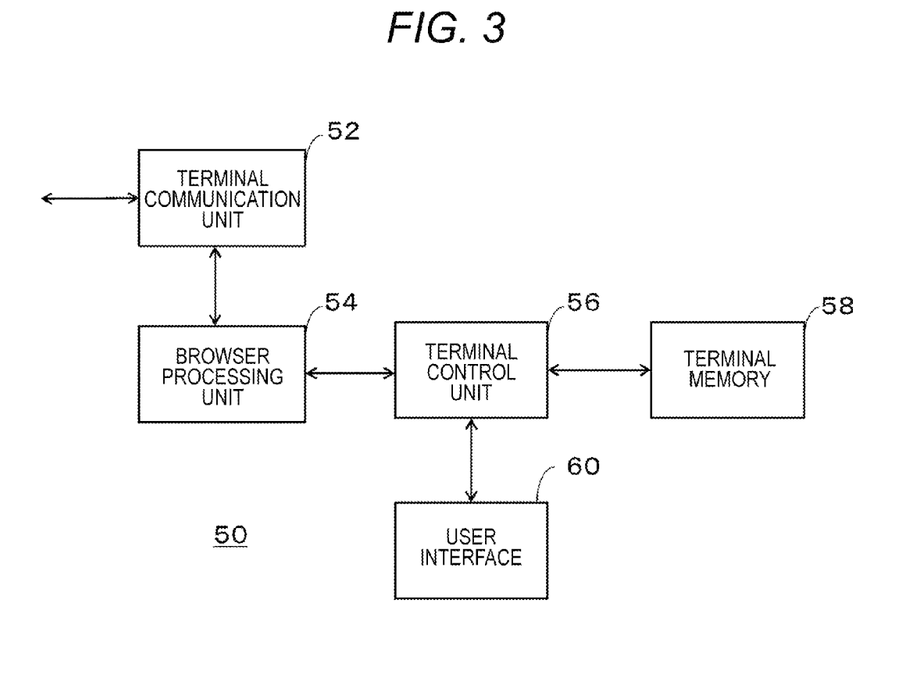
FIG. 3 is a diagram illustrating a configuration example in a mobile terminal or in a PC terminal in the authentication system of FIG. 1.

Next, a configuration at the client terminal side will be described. FIG. 3 is a diagram illustrating a configuration example in the mobile terminal 50 or in the PC terminal 70 of FIG. 1. Here, for convenience of description, a configuration of the mobile terminal 50 will be described. However, the PC terminal 70 has a similar configuration.

The mobile terminal 50 includes a terminal communication unit 52, a browser processing unit 54, a terminal control unit 56, a terminal memory 58, and a user interface 60. The terminal communication unit 52 executes transmission/reception processing of information related to the authentication processing between the service delivery server 10 and the authentication server 20.

The browser processing unit 54 controls a first browser that operates in a background, a second browser capable of receiving an input of the user information from the user, and a specific browser that operates as an external browser function of the application. The first browser is also called hidden browser (hidden embedded browser). The first and second browsers are browsers (embedded browsers) embedded inside a predetermined application as components, and can share session information each other. That is, the first and second browsers are browsers that exist in each application.

Meanwhile, the specific browser is a browser that can assist authentication. Since the specific browser operates as an external function of the application, the specific browser cannot share the session information with the first and second browsers embedded in the application. The specific browser may be an OS-standard browser, or may be a browser that can be shared in application cooperation and can start up any application. By realizing the authentication processing through the specific browser, the application cooperation becomes easy, and by conducting the log-in processing only once, the user does not need to perform the log-in processing when conducting another application after that.

Usually, the specific browser and the embedded browsers in the application cannot share Cookie. Therefore, such application cooperation is difficult. However, the service delivery server 10 is interposed between the authentication server 20 and the client terminal, and authentication processing in which the user is guaranteed to be the same at the start and the end is conducted in the authentication in the specific external browser, whereby SSO in application cooperation using the external browser can be realized.

The browser processing unit 54 first conducts the authentication processing between the first browser and the service delivery server 10. The first browser is used when processing that does not require user input is conducted. This enables high-speed processing without making the user aware of an operation. Then, when the situation turns to prompt the user to make an input, the browser processing unit 54 switches the operation to the second browser. This enables efficient processing.

For example, the browser processing unit 54 first conducts the authentication processing between the first browser and the service delivery server 10. Next, when a session between a started application and the service delivery server 10 has not been established and there is a need to prompt the user to input the user information, the browser processing unit 54 starts the second browser in order to receive the user information, and switches the authentication processing to between the second browser and the service delivery server 10.

Even in a case where a session has not been established between the application started in the client terminal that is an authentication requestor and the authentication server 20, but a session has been established between the specific browser of the client terminal and the authentication server 20, the browser processing unit 54 starts the specific browser instead of the second browser, and switches the processing to between the specific browser and the service delivery server 10.

The terminal control unit 56 receives an instruction of the user through the user interface 60 and manages execution of an application and the authentication processing while accessing the terminal memory 58. The execution of an application and the authentication processing are conducted in each application. The application includes a software development kit (SDK) that is a basic software library that controls an operation of an application, and a browser embedded in the application. Between them, the terminal control unit 56 conducts control of the SDK. The SDK controls processing of starting up the browser according to an instruction from the server.

Further, the user interface 60 includes a screen interface used for displaying a message to the user and a user information screen, an input interface that receives an input from the user including a keyboard and a touch panel, and an image pick-up means such as a camera.

The user interface 60 receives an execution request of an application from the user, and transmits the request to the terminal control unit 56. In addition, the user interface 60 displays a log-in screen as needed, receives the confidential information such as a user ID, a password, and the like or an input related to the log-in processing request using the specific browser, and transmits the input to the terminal control unit 56.

The terminal memory 58 stores an application downloaded from the service delivery server 10, image information received from the image pick-up means or other users, and contact address information that stores a name and a contact address in association with each other.

Here, an outline of a basic flow of the authentication system 100 will be described.

The service delivery server 10 issues Cookie for identification of a user agent to a browser embedded in application at the start of authentication, stores the Cookie in a verification capable manner, and then starts the specific browser such as an OS-standard external browser.

The specific browser accesses the service delivery server 10, and then makes a transition to the authentication server 20 by redirection, and performs the user authentication processing as needed. At a stage where the user authentication by the authentication server 20 has been completed, the specific browser is redirected to a return URL of the service delivery server 10, and makes a request to the service delivery server 10.

The service delivery server 10 holds the client confidential information such as a client ID relates to an application of the user terminal in advance, verifies a one-time ticket (code) and an ID token received from the authentication server 20 without through the client terminal, issues a user session with respect to the service delivery server 10 if the verification is appropriate, establishes a log-in session between the specific browser and the service delivery server 10, and then passes the one-time ticket (code) to the client terminal.

The client terminal that has received the one-time ticket starts the browser embedded in an application again, and passes the one-time ticket to the service delivery server 10. At this time, the service delivery server 10 verifies whether the user agent is appropriate based on information associated with Cookie in advance from the Cookie issued at the start of authentication, receives and verifies an access token for accessing a protection resource and an ID token associated with the one-time ticket from the authentication server 20 using the one-time ticket if the verification is appropriate, and establishes an authentication session between the browser embedded in an application and the service delivery server 10 if the verification is appropriate.

Specific description will be given. Here, examples of four types of authentication processing in the authentication system 100 of FIG. 1 will be described with reference to the four sequence diagrams illustrated in FIGS. 4 to 7.

Figure 4:
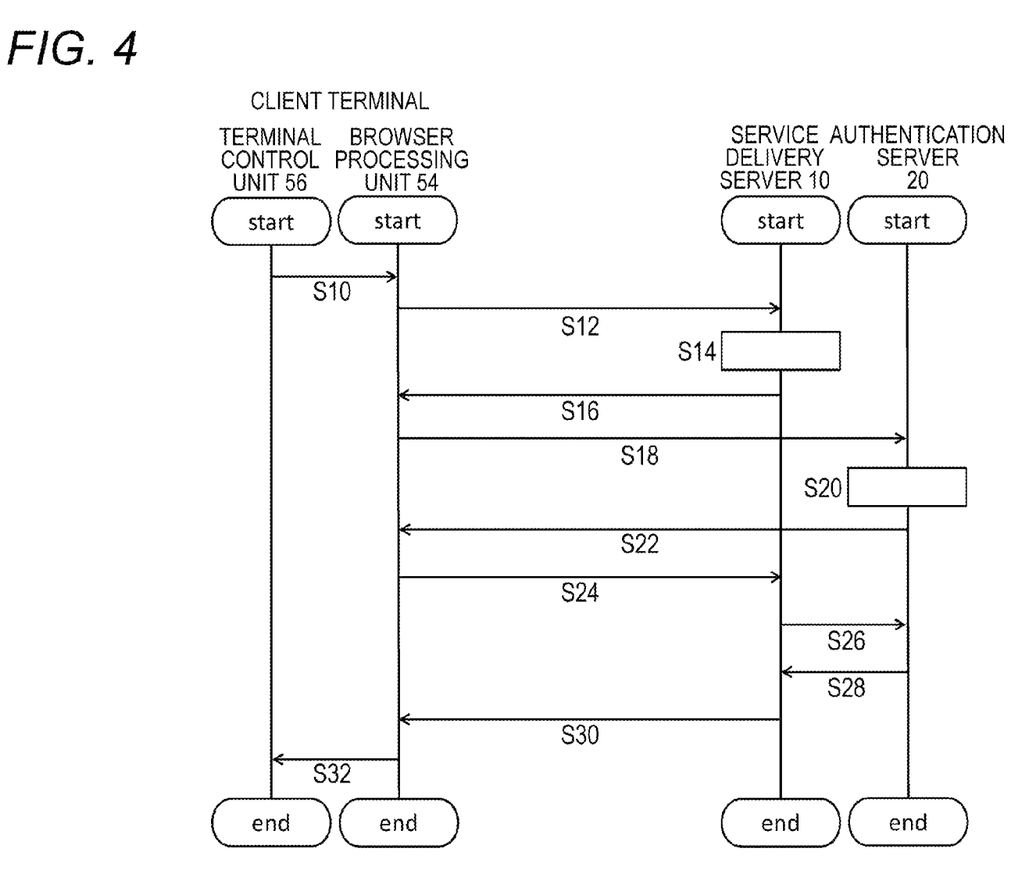
FIG. 4 is a sequence diagram illustrating an example of first authentication processing in the authentication system of FIG. 1.

FIG. 4 is a sequence diagram illustrating an example of first authentication processing in the authentication system 100 of FIG. 1. The example of first authentication processing indicates a case in which a session has been already established both of between the service delivery server 10 and the client terminal and between the authentication server 20 and the client terminal. The present sequence may be started upon execution of an application by the user through the user interface 60.

In the example of first authentication processing, the terminal control unit 56 indicates an SDK in an application in which the log-in processing is executed. In addition, the browser processing unit 54 processes the hidden browser from among the three browsers.

First, the terminal control unit 56 notifies the browser processing unit 54 of a message for starting a browser, and causes the browser processing unit 54 to start up the browser (S10).

The browser processing unit 54 notifies the service delivery server 10 of a message for requesting log-in to request log-in to an SDK service (S12). Here, the service delivery server 10 verifies whether a session has been already established between the service delivery server 10 and the client terminal (S14).

Here, in the example of first authentication processing, since a session between the service delivery server 10 and the client terminal has been already established, the service delivery server 10 notifies the browser processing unit 54 of a message for an authentication request together with an ID token, indicating the verification is affirmed, and allows the client terminal to conduct the authentication request to the authentication server 20 (S16).

Following that, the browser processing unit 54 notifies the authentication server 20 of the ID token and the message that indicates the authentication request received from the service delivery server 10 (S18).

The authentication server 20 verifies the notified ID token, and determines whether a session has been already established between the authentication server 20 and the client terminal (S20). In the example of first authentication processing, since a session has been already established between the authentication server 20 and the client terminal, the authentication server 20 notifies the browser processing unit 54 of a message indicating log-in is allowed and a code that is a one-time ticket in response to the authentication request (S22). This one-time ticket is a time expiration-type ticket, and the client terminal returns the ticket to the authentication server 20 through the service delivery server 10 within a predetermined period, thereby to obtain an access token that indicates access authorization.

The browser processing unit 54 notifies the service delivery server 10 of the message indicating log-in is allowed together with the code that is a one-time ticket transmitted from the authentication server 20 (S24). Here, the service delivery server 10 notifies the authentication server 20 of a message for requesting an access token for the client terminal together with the code (S26).

The authentication server 20 confirms the notified code, verifies that the authentication server 20 itself has issued the code for the client terminal, and then issues and sends an access token to the service delivery server 10 (S28). The service delivery server 10 sends the access token to the browser processing unit 54 (S30). Further, the browser processing unit 54 sends the access token to the terminal control unit 56 (S32). As described above, the client terminal obtains the access token, and can execute the application.

Figure 5:
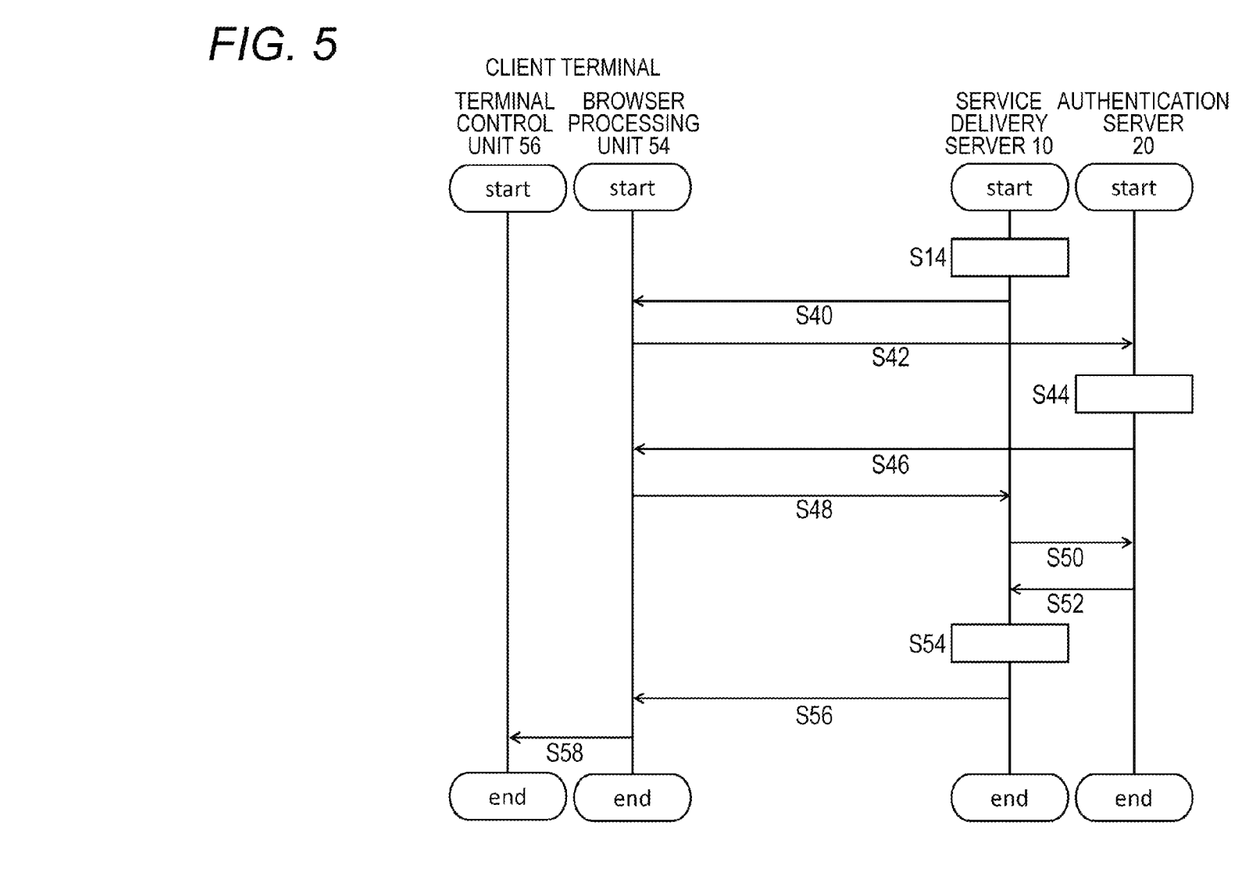
FIG. 5 is a sequence diagram indicating an example of second authentication processing in the authentication system of FIG. 1.

FIG. 5 is a sequence diagram illustrating an example of second authentication processing in an authentication system 100 of FIG. 1. The example of second authentication processing indicates a case in which a session has been already established between only the authentication server 20 and the client terminal, and has not yet been established between the service delivery server 10 and the client terminal.

In the example of second authentication processing, the terminal control unit 56 indicates a software development kit (SDK) in an application in which log-in is executed by the user. The browser processing unit 54 processes the hidden browser from among the three browsers.

The present sequence may be started upon execution of the application by the user through the user interface 60. Note that the processing of S10 and S12 of FIG. 4 is the same as the first authentication processing and thus description and drawing are omitted, and description will be given from the processing of S14.

In S14, the service delivery server 10 verifies whether a session has been already established between the server delivery sever 10 and the client terminal. However, in the example of second authentication processing, a session has not been established between the client terminal and the service delivery server 10. Therefore, the service delivery server 10 does not hold an ID token of the client terminal. Here, the service delivery server 10 notifies the browser processing unit 54 of a message for authentication confirmation (S40), and causes the authentication server 20 to confirm whether a session has been established.

Following that, the browser processing unit 54 notifies the authentication server 20 of a message as an authentication request (S42). Here, the authentication server 20 determines whether a session has been already established between the authentication server 20 and the client terminal (S44). Here, a session has been already established. Therefore, the authentication server 20 notifies the browser processing unit 54 of a message indicating the authentication has been confirmed and a code that is a one-time ticket (S46).

The browser processing unit 54 notifies the service delivery server 10 of the message indicating the authentication has been confirmed along with the code that is a one-time ticket (S48). Here, the service delivery server 10 notifies the authentication server 20 of a message for requesting an access token for the client terminal together with the code (S50).

The authentication server 20 confirms the notified code, verifies that the authentication server 20 has issued the code for the client terminal, and then issues and sends an access token to the service delivery server 10 together with an ID token (S52). This is because, in the example of second authentication processing, the service delivery server 10 does not have the ID token of the client terminal.

The service delivery server 10 compares the received ID token and the confidential information related to the application stored in advance, and verifies appropriateness of the ID token (S54). When a result of the verification is appropriate, the service delivery server 10 sends the access token to the browser processing unit 54 (S56). The browser processing unit 54 further sends the access token to the terminal control unit 56 (S58). As described above, a session has been established between the client terminal and the service delivery server 10, and the client terminal can execute the application using the access token.

Figure 6:
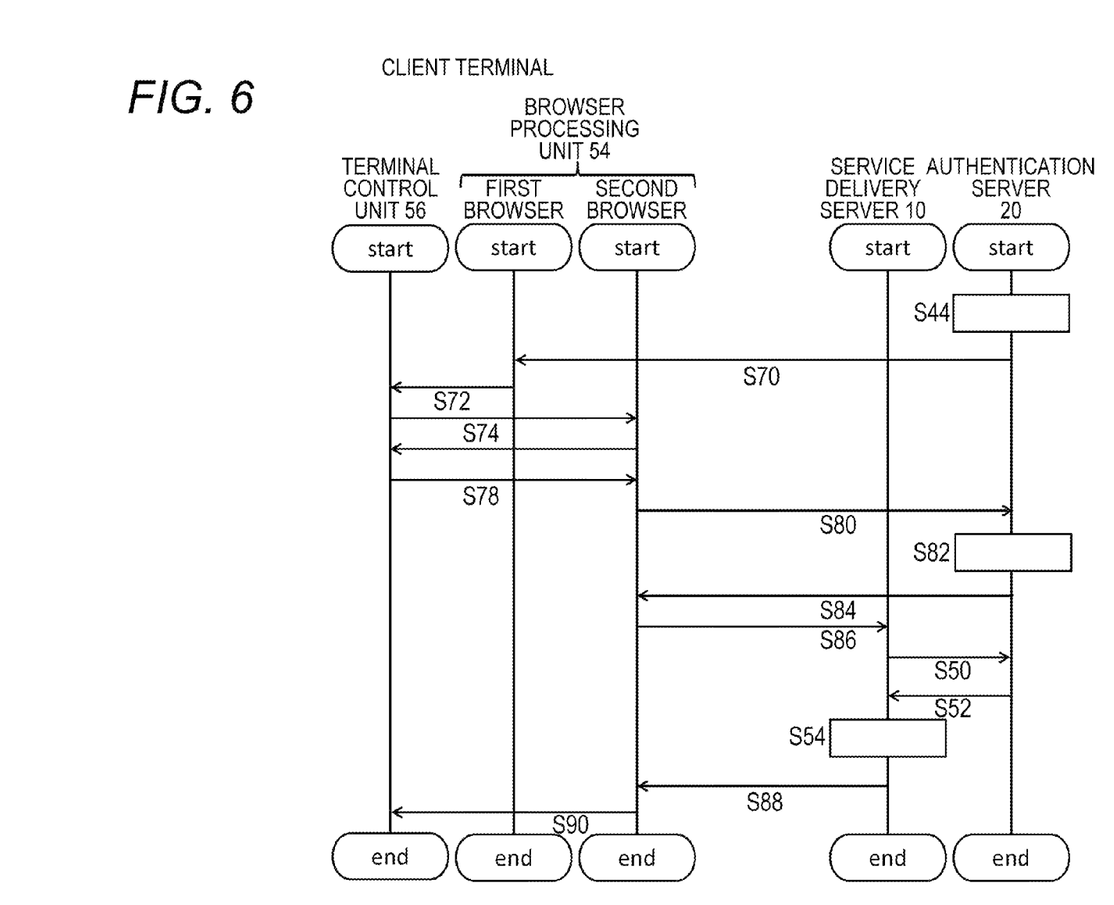
FIG. 6 is a sequence diagram illustrating an example of third authentication processing in the authentication system of FIG. 1.

FIG. 6 is a sequence diagram illustrating an example of third authentication processing in the authentication system 100 of FIG. 1. The example of third authentication processing indicates a case in which a session has not been established both of between the authentication server 20 and the client terminal and between the service delivery server 10 and the client terminal. This case assumes a case in which an application is started first.

In the example of third authentication processing, the terminal control unit 56 indicates an SDK in the application, in which log-in is executed by the user. Further, the browser processing unit 54 processes two browsers: the hidden embedded browser and the embedded browser from among the three browsers. FIG. 6 illustrates the hidden embedded browser as a first browser and the embedded browser as a second browser.

The present sequence may be started upon execution of the application by the user through the user interface 60. Note that the processing up to S44 of FIG. 5 is the same as the example of second authentication processing and thus description and drawing are omitted, and description will be given from the processing of S44.

In S44, the authentication server 20 determines whether a session has been already established between the authentication server 20 and the client terminal (S44). Here, a session has not been established. Therefore, the authentication server 20 notifies the first browser of an error response and a message for prompting the log-in processing through the service delivery server 10 (S70).

The first browser notifies the control unit 56 of a message for starting the log-in processing terminal (S72), and after that, the processing of browser is switched to the second browser that is capable of displaying a screen. Here, the terminal control unit 56 notifies the second browser of a message for requesting the log-in processing (S74).

Here, the second browser displays the user interface 60 (S76), and prompts an input from the user. When receiving an input such as a user ID and a password from the user through the user interface 60, the terminal control unit 56 notifies the second browser of the information input by the user as credential information (S78). The second browser notifies the authentication server 20 of the information notified from the terminal control unit 56 (S80).

The authentication server 20 confirms the user ID and the user password stored in advance, and verifies appropriateness of the notified information (S82). When a result of the verification is appropriate, the authentication server 20 notifies the second browser of a message indicating that the authentication has been confirmed together with a code that is a one-time ticket (S84).

The second browser notifies the service delivery server 10 of the message indicating that the authentication has been confirmed together with the code that is a one-time ticket (S86). Here, the service delivery server 10 notifies the authentication server 20 of a message for requesting an access token for the client terminal together with the code (S50).

Here, the authentication server 20 notifies the service delivery server 10 of the message for requesting an access token for the client terminal, the code, and an ID token (S52).

The service delivery server 10 compares the received ID token and the confidential information about the application stored in advance, and verifies appropriateness of the ID token (S54). When a result of the verification is appropriate, the service delivery server 10 sends an access token to the second browser (S88). Further, the second browser sends the access token to the terminal control unit 56 (S90). As described above, sessions are established both of between the service delivery server 10 and the client terminal and between the authentication server 20 and the client terminal, and the client terminal can execute the application using the access token.

Figure 7:
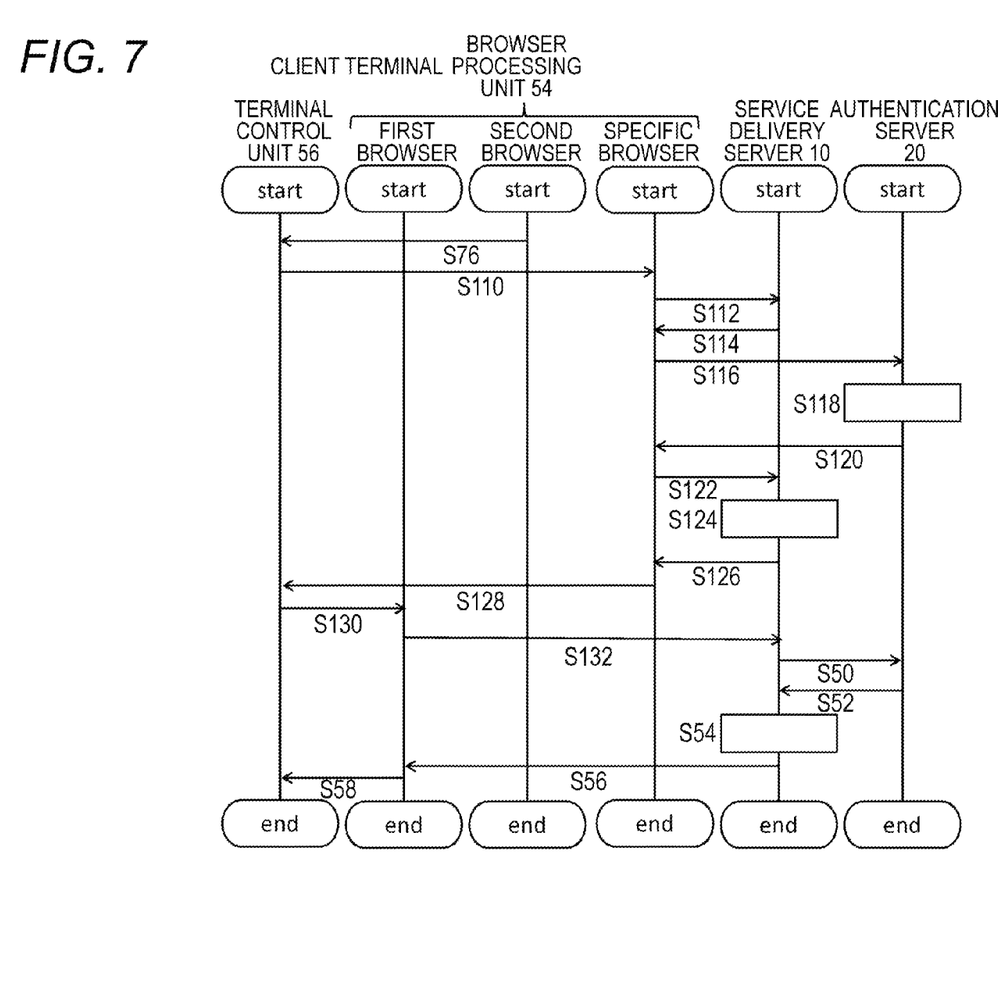
FIG. 7 is a sequence diagram illustrating an example of fourth authentication processing in the authentication system of FIG. 1.

FIG. 7 is a sequence diagram illustrating an example of fourth authentication processing in the authentication system 100 of FIG. 1. The example of fourth authentication processing indicates a case in which a session has not been established both of between the authentication server 20 and the client terminal and between the service delivery server 10 and the client terminal in the application. Further, a session has been established in an external browser that functions as the external browser. The present case assumes a case in which an application is started up after the log-in processing is completed using the external browser.

In the example of fourth authentication processing, the terminal control unit 56 indicates an SDK in the application, in which log-in is executed by the user. Further, the browser processing unit 54 processes three of the hidden embedded browser, the embedded browser, and the external browser from among the three browsers. FIG. 6 illustrates the hidden embedded browser as a first browser, the embedded browser as a second browser, and the external browser as a specific browser. Note that the specific browser is a browser that operates outside the application.

The present sequence may be started upon execution of the application by the user through the user interface 60. Note that the processing up to S76 of FIG. 5 is the same as the example of third authentication processing and thus description and drawing are omitted, and description will be given from the processing of S76.

Here, the second browser displays the user interface 60 and prompts an input from the user (S76). When receiving a log-in request from the user using the specific browser through the user interface 60, the terminal control unit 56 notifies the specific browser of the information (S110). The specific browser notifies the service delivery server 10 of a message for requesting SSO processing using the external browser (S112).

The service delivery server 10 notifies the specific browser of a message related to the authentication request (S114). Following that, the specific browser notifies the authentication server 20 of a message related to the authentication request (S116).

Here, the authentication server 20 verifies session information with the external browser (S118), and notifies a message indicating authentication has been confirmed and to which the code that is a one-time ticket and an ID token are attached (S120).

The specific browser notifies the service delivery server 10 of a message indicating that authentication has been confirmed together with the ID token (S122). The service delivery server 10 verifies the ID token (S124), and notifies the specific browser of the message indicating that authentication has been confirmed (S126).

Further, the specific browser notifies the terminal control unit 56 of a message for completing the session processing in the application together with the code obtained from the authentication server 20 (S128). In response, the terminal control unit 56 notifies the first browser of the message together with the code (S130). Here, it is not necessary to receive an input from the user, and thus the notification is given to the first browser rather than to the second browser in consideration of acceleration of the processing and accessibility of the user.

The first browser notifies the service delivery server 10 of the message to which the code is attached (S132). Here, the service delivery server 10 notifies the authentication server 20 of a message for requesting an access token for the client terminal together with the code (S50).

Here, the authentication server 20 notifies the service delivery server 10 of the message for requesting an access token for the client terminal, the code, and the ID token (S52).

The service delivery server 10 compares the received ID token and the confidential information stored in advance, and verifies appropriateness of the ID token (S54). When a result of the verification is appropriate, the service delivery server 10 sends the access token to the first browser (S56). Further, the first browser sends the access token to the terminal control unit 56 (S58). As described above, sessions have been established both of between the service delivery server 10 and the client terminal and between the authentication server 20 and the client terminal, and the client terminal can execute the application using the access token.

When a session has been established in either server, the session information held by the server complement one another, whereby the session can be efficiently established.

According to an aspect like the above, the service delivery server 10 that receive an authentication request from the client terminal and the authentication server 20 execute the authentication processing in cooperation with each other and based on the authentication information related to the client terminal stored in each server in advance, whereby the authentication processing can be completed by the service delivery server 10 and the authentication server 20, and more secure authentication processing can be realized.

In addition, the authentication processing is executed using a one-time ticket issued in association with the client terminal, whereby secure authentication processing can be executed. In addition, the one-time ticket is passed on to the client terminal and is returned to the authentication server 20 through the service delivery server 10, so that the confidential information of the application is not held in the client terminal and the authentication processing can be completed by the service delivery server 10 and the authentication server 20, whereby secure authentication processing can be realized.

Further, it is determined that a session has been established when the authentication confirmation of an ID token of the client terminal that is an authentication requestor is succeeded, or when the log-in processing from the application started in the client terminal is confirmed, whereby secure SSO processing can be efficiently executed.

Further, when a session has been established between an application started by the client terminal that is an authentication requestor and the service delivery server 10, the service delivery server 10 issues session information including an ID token to the client terminal, and the authentication server 20 verifies whether a session has been established by verifying the ID token obtained through the client terminal, whereby secure SSO processing can be efficiently executed.

Further, when a session has not been established between an application started in the client terminal of the authentication requestor and the authentication server 20, the client terminal sends the user information to the authentication server 20, the authentication server 20 issues an ID token and sents the ID token to the service delivery server 10 together with an access token after verifying the received user information, and the service delivery server 10 verifies the obtained ID token and established a session, whereby secure SSO processing can be efficiently executed.

Further, when a session has not been established between an application started by the client terminal that is an authentication requestor and the service delivery server 10 and the user is prompted to input the user information after the authentication processing is executed by the first browser between the first browser and the service delivery server 10, the second browser is started in order to receive the user information, and the authentication processing is switched to between the second browser and the service delivery server 10, whereby secure SSO processing can be more smoothly executed without making the user aware of an operation.

Further, even if a session has not been established between an application started in the client terminal that is an authentication requestor and the authentication server 20, but a session has been established between the specific browser of the client terminal and the authentication server 20, the specific browser is started in place of the second browser, and the processing is switched to between the specific browser and the service delivery server 10, whereby secure SSO processing can be efficiently executed.

Further, the service delivery server 10 manages the confidential information of the client terminal, and session management for identifying a browser when performing cooperation between the service delivery server 10 and the client terminal that stores an application is performed on the service delivery server 10, whereby more enhanced security is ensured.

To be specific, Cookie management for identification of an embedded browser before and after cooperation when application cooperation is interposed in an authentication transaction can be guaranteed by a platform. It is not necessary to store the confidential information of the client terminal used for communication with the authentication server 20 in an installation-type application. Therefore, wrongdoing such as an attack of authentication ticket replacement cannot be easily established, and enhanced security can be realized.

The present invention has been described on the basis of the embodiments. The present invention is not limited to the above-described embodiment and the content of the embodiments, and can be conducted by various modifications within the scope of the gist of the present invention. A person skilled in the art would understand that the above embodiments are described for illustrative purposes only, variety of modifications are possible for the combination of the configuration elements and the processing processes of the embodiments, and such modifications fall within the scope of the present invention.

What is claimed is:

1. An authentication method in a system including a client terminal that stores one or more applications, a service delivery server connected with the client terminal through a network and configured to provide the client terminal with a service, and an authentication server connected with the client terminal and the service delivery server and configured to execute authentication processing, the method comprising:

transmitting, by the client terminal, a signal related to an authentication request to the service delivery server through a browser every time an application is started by an instruction from a user;

for the authentication request indicative of permitting a session, establishing the session by the service delivery server with the application of the client terminal and storing the session in the service delivery server;

issuing, by the service delivery server, session information related to the client terminal when receiving the authentication request from the client terminal, attaching the session information to the authentication request, and returning the authentication request to the client terminal;

transmitting, by the client terminal, the authentication request to which the session information is attached to the authentication server; and upon receiving the authentication request from the client terminal, executing, by the authentication server, authentication processing in cooperation with the service delivery server based on authentication information of the application of the client terminal, the established session stored in the service delivery server, and user information related to the user stored in the authentication server.

2. The authentication method according to claim 1, wherein when a session has been established between the authentication server and at least one application in the client terminal regarding the authentication request, the authentication server issues an ID token of the client terminal, and the service delivery server establishes a session between the service delivery sever and an application newly started by the client terminal regarding the ID token after determining the client terminal has been authenticated by the authentication server by verifying the ID token issued by the authentication server.

3. The authentication method according to claim 1, wherein when a session has been established between the service delivery server and at least one application in the client terminal regarding the authentication request, the service delivery server issues an ID token of the client terminal, and the authentication server establishes a session between the authentication server and an application newly started by the client terminal regarding the ID token after determining the client terminal has been authenticated by the service delivery server by verifying the ID token issued by the service delivery server.

4. The authentication method according to claim 2, wherein when a session has been established between the service delivery server and at least one application in the client terminal regarding the authentication request, the service delivery server issues an ID token of the client terminal, and the authentication server establishes a session between the authentication server and an application newly started by the client terminal regarding the ID token after determining the client terminal has been authenticated by the service delivery server by verifying the ID token issued by the service delivery server.

5. The authentication method according to claim 1, wherein the client terminal controls a first browser configured to operate in a background and a second browser capable of receiving an input of the user information from the user, the first browser and the second browser are operable while sharing the session information each other as a function of the application, and the client terminal causes the first browser to execute the authentication processing between the first browser and the service delivery server, and when a session has not been established between the application started in the client terminal that is an authentication requestor and the service delivery server, and the user is prompted to input the user information, the client terminal starts the second browser in order to receive the user information, and switching the authentication processing to between the second browser and the service delivery server.

6. The authentication method according to claim 2, wherein the client terminal controls a first browser configured to operate in a background and a second browser capable of receiving an input of the user information from the user, the first browser and the second browser are operable while sharing the session information each other as a function of the application, and the client terminal causes the first browser to execute the authentication processing between the first browser and the service delivery server, and when a session has not been established between the application started in the client terminal that is an authentication requestor and the service delivery server, and the user is prompted to input the user information, the client terminal starts the second browser in order to receive the user information, and switching the authentication processing to between the second browser and the service delivery server.

7. The authentication method according to claim 3, wherein the client terminal controls a first browser configured to operate in a background and a second browser capable of receiving an input of the user information from the user, the first browser and the second browser are operable while sharing the session information each other as a function of the application, and the client terminal causes the first browser to execute the authentication processing between the first browser and the service delivery server, and when a session has not been established between the application started in the client terminal that is an authentication requestor and the service delivery server, and the user is prompted to input the user information, the client terminal starts the second browser in order to receive the user information, and switching the authentication processing to between the second browser and the service delivery server.

8. The authentication method according to any one of claim 4, wherein the client terminal controls a first browser configured to operate in a background and a second browser capable of receiving an input of the user information from the user, the first browser and the second browser are operable while sharing the session information each other as a function of the application, and the client terminal causes the first browser to execute the authentication processing between the first browser and the service delivery server, and when a session has not been established between the application started in the client terminal that is an authentication requestor and the service delivery server, and the user is prompted to input the user information, the client terminal starts the second browser in order to receive the user information, and switching the authentication processing to between the second browser and the service delivery server.

9. The authentication method according to claim 5, wherein
the client terminal includes an authentication assist application that operates as an external function of the application, and does not share the session information with the first browser and the second browser, and
even if a session has not been established between the started application and the authentication server, but a session has been established between the authentication assist application and the authentication server, the client terminal starts the authentication assist application in place of the second browser, and switches the authentication processing to between the authentication assist application and the service delivery server.

10. The authentication method according to claim 6, wherein
the client terminal includes an authentication assist application that operates as an external function of the application, and does not share the session information with the first browser and the second browser, and
even if a session has not been established between the started application and the authentication server, but a session has been established between the authentication assist application and the authentication server, the client terminal starts the authentication assist application in place of the second browser, and switches the authentication processing to between the authentication assist application and the service delivery server.

11. The authentication method according to claim 7, wherein
the client terminal includes an authentication assist application that operates as an external function of the application, and does not share the session information with the first browser and the second browser, and
even if a session has not been established between the started application and the authentication server, but a session has been established between the authentication assist application and the authentication server, the client terminal starts the authentication assist application in place of the second browser, and switches the authentication processing to between the authentication assist application and the service delivery server.

12. The authentication method according to claim 8, wherein
the client terminal includes an authentication assist application that operates as an external function of the application, and does not share the session information with the first browser and the second browser, and
even if a session has not been established between the started application and the authentication server, but a session has been established between the authentication assist application and the authentication server, the client terminal starts the authentication assist application in place of the second browser, and switches the authentication processing to between the authentication assist application and the service delivery server.

13. An authentication system comprising:
a client terminal storing one or more applications;
a service delivery server connected with the client terminal through a network, and configured to provide the client terminal with a service; and
an authentication server connected with the client terminal and the service delivery server, and configured to execute authentication processing,
wherein the client terminal transmits a signal related to an authentication request to the service delivery server through a browser every time an application is started by an instruction from a user,
for the authentication request indicative of permitting a session, the service delivery server establishes the session with the application of the client terminal and stores the session in the service delivery server;
the service delivery server issues session information related to the client terminal when receiving the authentication request from the client terminal, attaches the session information to the authentication request, and returns the authentication request to the client terminal,
the client terminal transmits the authentication request to which the session information is attached to the authentication server, and
upon receiving the authentication request from the client terminal, the authentication server executes the authentication processing in cooperation with the service delivery server based on authentication information of the application of the client terminal, the established session stored in the service delivery server, and user information related to the user stored in the authentication server.

14. A service delivery server in a system including a client terminal that stores one or more applications, a service delivery server connected with the client terminal through a network and configured to provide the client terminal with a service, and an authentication server connected with the client terminal and the service delivery server and configured to execute authentication processing, the service delivery server comprising:
a server communication unit configured to, for the authentication request indicative of permitting a session, establish the session with an application of the client terminal and store the session in the service delivery server, issue session information related to the client terminal when receiving an authentication request from the client terminal, to attach the session information to the authentication request and to return the authentication request, and to causes the client terminal to transit the authentication request to which the session information is attached to the authentication server; and
an authentication control unit configured, upon receiving the authentication request from the client terminal, to execute the authentication processing in cooperation with the authentication server based on authentication information of the application of the client terminal, the established session stored in the service delivery server, and user information related to the user stored in the authentication server.

15. An authentication method in a service delivery server in a system including a client terminal that stores one or more applications, a service delivery server connected with the client terminal through a network and configured to provide the client terminal with a service, and an authentication server connected with the client terminal and the service delivery server and configured to execute authentication processing, the authentication method comprising the steps of:
receiving an authentication request from the client terminal;
for the authentication request indicative of permitting a session, establishing the session with an application of the client terminal and storing the session in the service delivery server,
issuing session information related to the client terminal;

attaching the session information to the authentication request and returning the authentication request, and causing the client terminal to transmit the authentication request to which the session information is attached to the authentication server; and upon receiving the authentication request from the client terminal, executing the authentication processing in cooperation with the authentication server based on authentication information of the application of the client terminal, the established session stored in the service delivery server, and user information related to the user stored in the authentication server.

* * * * *